(12) United States Patent
Okita et al.

(10) Patent No.: US 10,640,170 B2
(45) Date of Patent: May 5, 2020

(54) STRADDLE-TYPE VEHICLE (71) Applicant: SUZUKI MOTOR CORPORATION, Hamamatsu-shi, Shizuoka (JP)

(72) Inventors: Kazuhiro Okita, Hamamatsu (JP); Takaya Suzuki, Hamamatsu (JP)

(73) Assignee: SUZUKI MOTOR CORPORATION, Hamamatsu-Shi (JP)

( * ) Notice: Subject to any disclaimer, the term of this patent is extended or adjusted under 35 U.S.C. 154(b) by 182 days.

(21) Appl. No.: 16/016,121

(22) Filed: Jun. 22, 2018

(65) Prior Publication Data
US 2019/0010859 A1 Jan. 10, 2019

(30) Foreign Application Priority Data

Jul. 4, 2017 (JP) .................................. 2017-131437

(51) Int. Cl.
| B62M 7/06 | (2006.01) |
| F01P 7/16 | (2006.01) |
| F01P 3/18 | (2006.01) |
| F01P 5/10 | (2006.01) |
| F02B 29/04 | (2006.01) |
| F02M 35/04 | (2006.01) |
| F02B 61/02 | (2006.01) |

(52) U.S. Cl.
CPC ................. *B62M 7/06* (2013.01); *F01P 3/18* (2013.01); *F01P 5/10* (2013.01); *F01P 7/165* (2013.01); *F02B 29/0406* (2013.01); *F02B 61/02* (2013.01); *F02M 35/048* (2013.01); *F01P 2003/187* (2013.01); *F01P 2025/32* (2013.01); *F01P 2037/00* (2013.01); *F01P 2050/16* (2013.01); *F01P 2060/04* (2013.01); *F01P 2060/12* (2013.01)

(58) Field of Classification Search
CPC ............. B62M 7/06; B62M 7/02; F01P 11/04
See application file for complete search history.

(56) References Cited

U.S. PATENT DOCUMENTS

| 7,322,318 | B2 * | 1/2008 | Nagahashi | ............... | F01M 1/08 123/196 R |
| 9,850,803 | B2 * | 12/2017 | Okita | ........................ | F01P 7/14 |
| 10,086,903 | B2 * | 10/2018 | Hamaguchi | ............ | B62K 11/04 |
| 10,087,828 | B2 * | 10/2018 | Okita | ..................... | B60K 13/04 |
| 10,167,767 | B2 * | 1/2019 | Okita | ........................ | F01P 3/12 |
| 10,208,647 | B2 * | 2/2019 | Okita | ........................ | F01P 3/12 |
| 2015/0107923 | A1 | 4/2015 | Inayama | | |

FOREIGN PATENT DOCUMENTS

JP 2015-81575 A 4/2015

* cited by examiner

Primary Examiner — Kevin Hurley
(74) Attorney, Agent, or Firm — Stein IP, LLC (57) ABSTRACT There is provided a straddle-type vehicle. A water jacket is configured to cool an engine by cooling water discharged from a water pump. A radiator is arranged in front of the engine. A cooling water stream control unit is configured to control a flow rate of the cooling water to circulate in the radiator, based on a temperature of the cooling water after cooling the engine. The water pump is mounted to a part of a crankcase at one side in a right and left direction of the straddle-type vehicle. The cooling water stream control unit is arranged at a position that is located at the one side of a center of the straddle-type vehicle in the right and left direction, is lower than a cylinder head cover and is located between the engine and the radiator, when seeing the straddle-type vehicle from a side.

7 Claims, 9 Drawing Sheets

STRADDLE-TYPE VEHICLE

CROSS-REFERENCE TO RELATED APPLICATIONS

The disclosure of Japanese Patent Application No. 2017-131437 filed on Jul. 4, 2017, including specification, drawings and claims is incorporated herein by reference in its entirety.

TECHNICAL FIELD

The present disclosure relates to a straddle-type vehicle including a water-cooling type cooling structure configured to cool an engine and the like by using cooling water.

BACKGROUND

A water-cooling type cooling structure configured to cool an engine and the like of a straddle-type vehicle such as a motorcycle includes a water pump configured to discharge cooling water, a water jacket configured to cool the engine by the cooling water discharged from the water pump, a radiator configured to cool the cooling water after cooling the engine, and a thermostat configured to control a flow rate of the cooling water to circulate in the radiator, based on a temperature of the cooling water.

The water jacket is provided in the vicinity of a part of the engine, from which high heat is to be generated, such as a peripheral wall of a cylinder and an inside of a cylinder head. The water pump is generally mounted to the engine. The radiator is mounted to a place of the straddle-type vehicle such as a front of the engine, which is likely to collide with wind upon traveling.

Also, the water-cooling type cooling structure has a radiator inflow path through which the cooling water discharged from the water pump and circulated in the water jacket is to flow into the radiator, a radiator outflow path through which the cooling water caused to flow out from the radiator is to return to the water pump, and a radiator bypass path branched on the way of the radiator inflow path and joining on the way of the radiator outflow path. The radiator bypass path is a path for returning the cooling water having circulated in the water jacket to the water pump without circulating the cooling water in the radiator. The thermostat is arranged at a position at which the radiator bypass path and the radiator outflow path join, for example, and is configured to control a ratio of a flow rate of the cooling water to circulate in the radiator and a flow rate of the cooling water to circulate in the radiator bypass path.

Patent Document 1 discloses a motorcycle having a water-cooling type cooling structure.

Patent Document 1: JP-A-2015-81575

In order to improve a design property of an outer appearance of the straddle-type vehicle, it is preferable that the cooling structure is made to be inconspicuous, when seeing the straddle-type vehicle from an outside. Also, it is preferably to reduce a width of an engine unit including the engine and components mounted to the engine such as a drive system, an intake system, an exhaust system and the like.

Regarding this, according to the motorcycle disclosed in Patent Document 1, the water pump, a cooling water piping configured to interconnect a cylinder block and an inlet of the radiator, and a cooling water piping configured to interconnect an outlet of the radiator and the water pump are arranged above the engine. Also, Patent Document 1 does not disclose arrangement of the thermostat. However, since the cooling water piping configured to interconnect the cylinder block and the inlet of the radiator and the cooling water piping configured to interconnect the outlet of the radiator and the water pump are arranged above the engine, it is thought that it is not difficult to arrange the thermostat above the engine. Like this, since the components configuring the cooling structure are arranged above the engine, it is thought that it is possible to cover and hide the components with a fuel tank and to thus make the components inconspicuous. Also, since the components configuring the cooling structure are arranged above the engine, it is thought that it is easy to reduce the width of the engine unit.

However, according to the motorcycle disclosed in Patent Document 1, it is necessary to secure a space for arranging the components configuring the cooling structure above the engine. For this reason, it is difficult to arrange a large fuel tank above the engine, so that it is difficult to increase a capacity of the fuel tank.

SUMMARY

The present disclosure has been made in view of the above situations, and is to provide a straddle-type vehicle capable of implementing a cooling structure of an engine and the like having satisfied needs for improvement on a design property of an outer appearance of the vehicle and for capacity enlargement of a fuel tank.

According to an aspect of the embodiments of the present disclosure, there is provided a straddle-type vehicle comprising: an engine comprising a crankcase, a cylinder provided above the crankcase, a cylinder head provided above the cylinder, and a cylinder head cover provided above the cylinder head; a water pump configured to discharge cooling water; a water jacket configured to cool the engine by the cooling water discharged from the water pump; a radiator arranged in front of the engine and configured to cool the cooling water after cooling the engine; and a cooling water stream control unit configured to control a flow rate of the cooling water to circulate in the radiator, based on a temperature of the cooling water after cooling the engine, wherein the water pump is mounted to a part of the crankcase at one side in a right and left direction of the straddle-type vehicle, and wherein the cooling water stream control unit is arranged at a position that is located at the one side of a center of the straddle-type vehicle in the right and left direction, is lower than the cylinder head cover and is located between the engine and the radiator, when seeing the straddle-type vehicle from a side According to the present disclosure, it is possible to implement the cooling structure of the engine and the like having satisfied needs for improvement on a design property of an outer appearance of the straddle-type vehicle and for capacity enlargement of the fuel tank.

DETAILED DESCRIPTION OF THE EMBODIMENTS

A straddle-type vehicle of an illustrative embodiment of the present disclosure includes an engine, a water pump, a water jacket, a radiator and a cooling water stream control unit.

The engine includes a crankcase, a cylinder provided above the crankcase, a cylinder head provided above the cylinder, and a cylinder head cover provided above the cylinder head.

The water pump has a function of discharging cooling water, and is mounted to one side of the crankcase in a right and left direction of the straddle-type vehicle. The water jacket has a function of cooling the engine by the cooling water discharged from the water pump. The radiator has a function of cooling the cooling water after cooling the engine, and is arranged in front of the engine.

The cooling water stream control unit has a function of controlling a flow rate of the cooling water to circulate in the radiator, based on a temperature of the cooling water after cooling the engine. This function can be implemented using a thermostat, for example. The cooling water stream control unit is arranged at a position that is located at one side of a center of the straddle-type vehicle in the right and left direction, is lower than the cylinder head cover and is located between the engine and the radiator, when seeing the straddle-type vehicle from a side.

According to the straddle-type vehicle of the illustrative embodiment of the present disclosure, the cooling water stream control unit is arranged at the position lower than the cylinder head cover, so that it is possible to easily form a space above the engine, which can be used to arrange a fuel tank. Thereby, it is possible to enlarge the fuel tank and to increase a capacity of the fuel tank.

Also, the cooling water stream control unit is arranged between the engine and the radiator, so that it is possible to make the cooling water stream control unit inconspicuous, when seeing the straddle-type vehicle from an outside. Thereby, it is possible to improve a design property of an outer appearance of the straddle-type vehicle.

Also, the cooling water stream control unit is arranged between the engine and the radiator, so that it is possible to easily prevent the cooling water stream control unit or the piping connected thereto from protruding laterally from the engine unit. Accordingly, it is possible to reduce a width (a length in the right and left direction) of the engine unit, so that it is possible to improve the design property of the outer appearance of the straddle-type vehicle.

Also, the cooling water stream control unit is arranged between the engine and the radiator, so that it is possible to arrange the cooling water stream control unit in close vicinity to the radiator. Thereby, it is possible to shorten the piping configured to interconnect a cooling water stream control unit and the radiator, so that it is possible to make the piping inconspicuous.

Also, the water pump is mounted to one side of the crankcase in the right and left direction of the straddle-type vehicle, and the cooling water stream control unit is arranged at the position, which is lower than the cylinder head cover and is located between the engine and the radiator, at the same side as the water pump in the right and left direction of the straddle-type vehicle, so that the water pump and the cooling water stream control unit can be arranged closely to each other. Thereby, it is possible to shorten a piping configured to interconnect the cooling water stream control unit and the water pump, so that it is possible to make the piping inconspicuous.

Illustrative Embodiment (Straddle-Type Vehicle)

Figure 1:
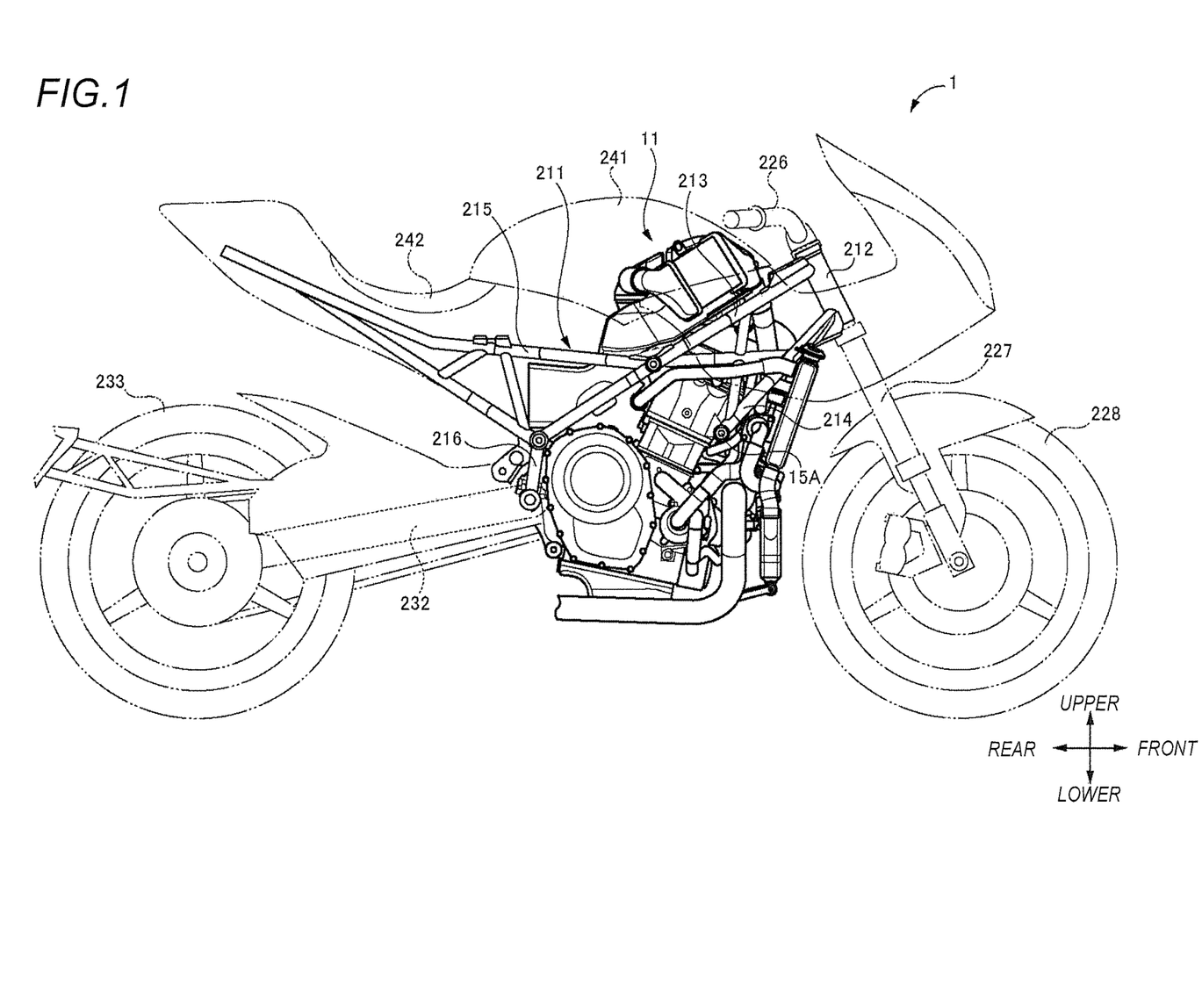
FIG. 1 illustrates a straddle-type vehicle of an illustrative embodiment of the present disclosure, as seen from the right.

FIG. 1 depicts a straddle-type vehicle 1 of the illustrative embodiment of the present disclosure. Meanwhile, in FIG. 1, for convenience of descriptions, parts except a vehicle body frame 211 and an engine unit 11 of the straddle-type vehicle 1 are shown with dashed-two dotted lines. Also, in the descriptions of the illustrative embodiment, front, rear, left, right, upper and lower directions are described on the basis of a driver who drives the straddle-type vehicle 1.

In FIG. 1, the straddle-type vehicle 1 is a motorcycle. The vehicle body frame 211 of the straddle-type vehicle 1 has a head pipe 212, a pair of main frames 213, a pair of down tubes 214, a pair of side frames 215, and a pair of pivot frames 216. The head pipe 212 is arranged at an upper side of a front part of the straddle-type vehicle 1. The pair of main frames 213 is respectively arranged at a left side and a right side of the straddle-type vehicle 1, and front end portions thereof are connected to an upper part of the head pipe 212, and rear ends extend rearward with being inclined downward. The pair of down tubes 214 is respectively arranged at the left side and the right side of the straddle-type vehicle 1, and front end portions thereof are connected to a lower part of the head pipe 212, and rear ends extend rearward with being more inclined downward than the main frames 213. The pair of side frames 215 is respectively arranged at the left side and the right side of the straddle-type vehicle 1, and front end portions thereof are connected intermediate parts of the down tubes 214, and rear ends extend rearward. The pair of pivot frames 216 is joined to the rear ends of the main frames 213, respectively.

Also, a steering shaft (not shown) is inserted in the head pipe 212, a handle 226 and front forks 227 are respectively supported to the steering shaft via brackets, and a front wheel 228 is supported to lower ends of the front forks 227. In the meantime, a front end of a swing arm 232 is supported between the pair of left and right pivot frames 216, and a rear wheel 233 is supported to a rear end of the swing arm 232.

Also, an engine unit 11 is provided between the front wheel 228 and the rear wheel 233 of the straddle-type vehicle 1. The engine unit 11 is mainly arranged between the left main frame 213 and left down tube 214 and the right main frame 213 and right down tube 214, and is supported to the frames. Also, a fuel tank 241 is provided above the engine unit 11, and a seat 242 is provided at the rear of the fuel tank 241.

(Engine Unit)

Figure 2:
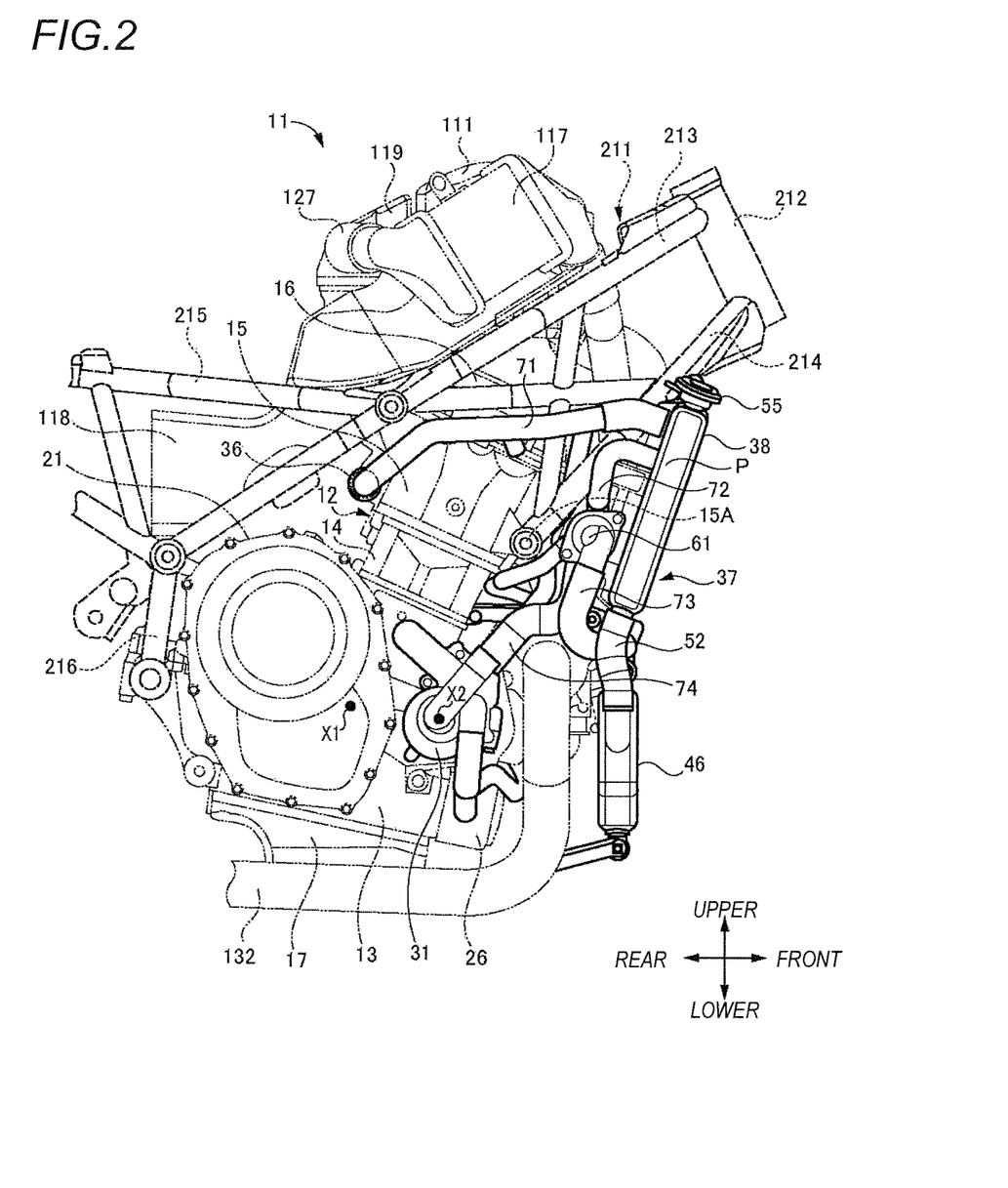
FIG. 2 illustrates an engine unit and a part of a vehicle body frame, as seen from the right.
Figure 3:
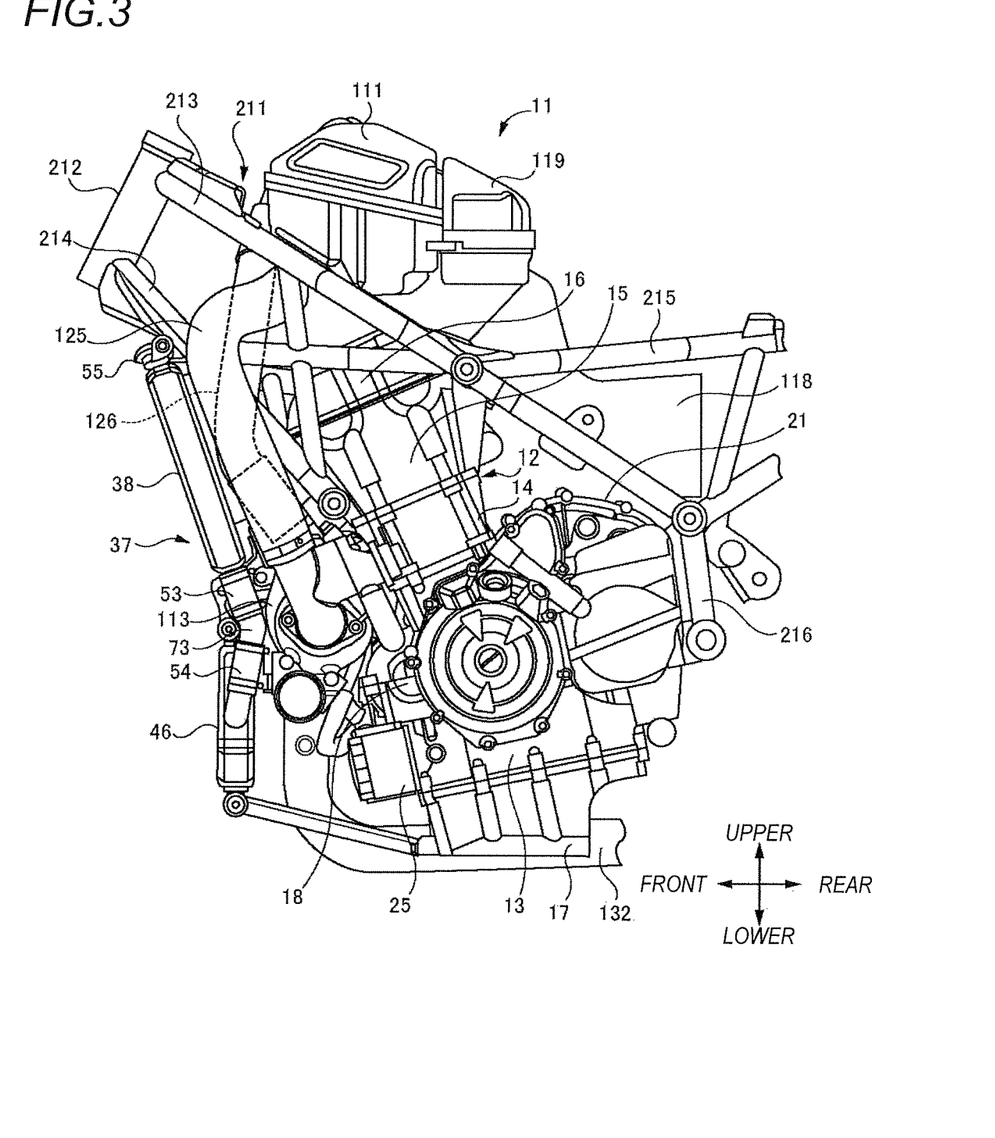
FIG. 3 illustrates the engine unit and a part of the vehicle body frame, as seen from the left.
Figure 4:
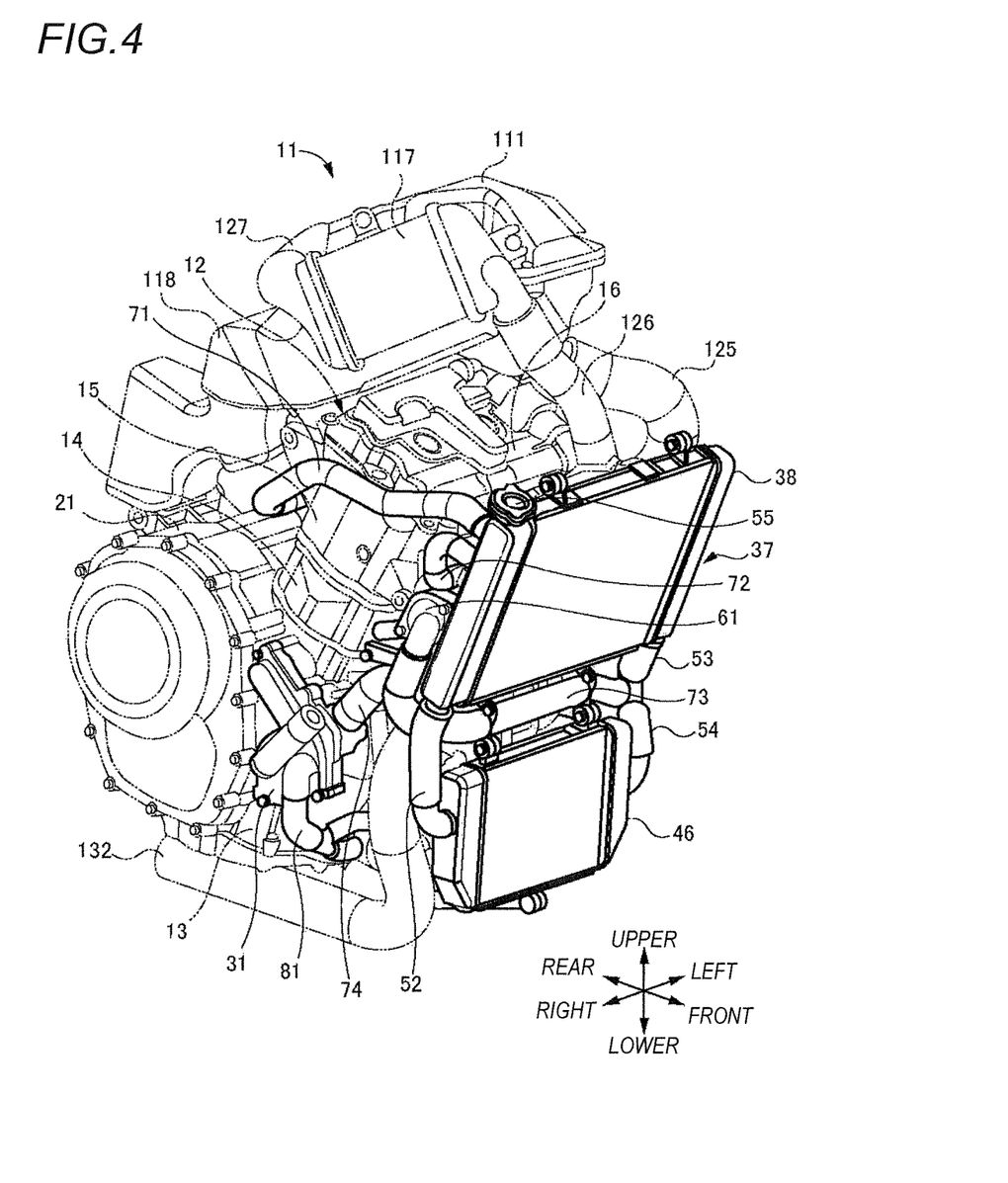
FIG. 4 illustrates the engine unit, as seen from the right front.
Figure 5:
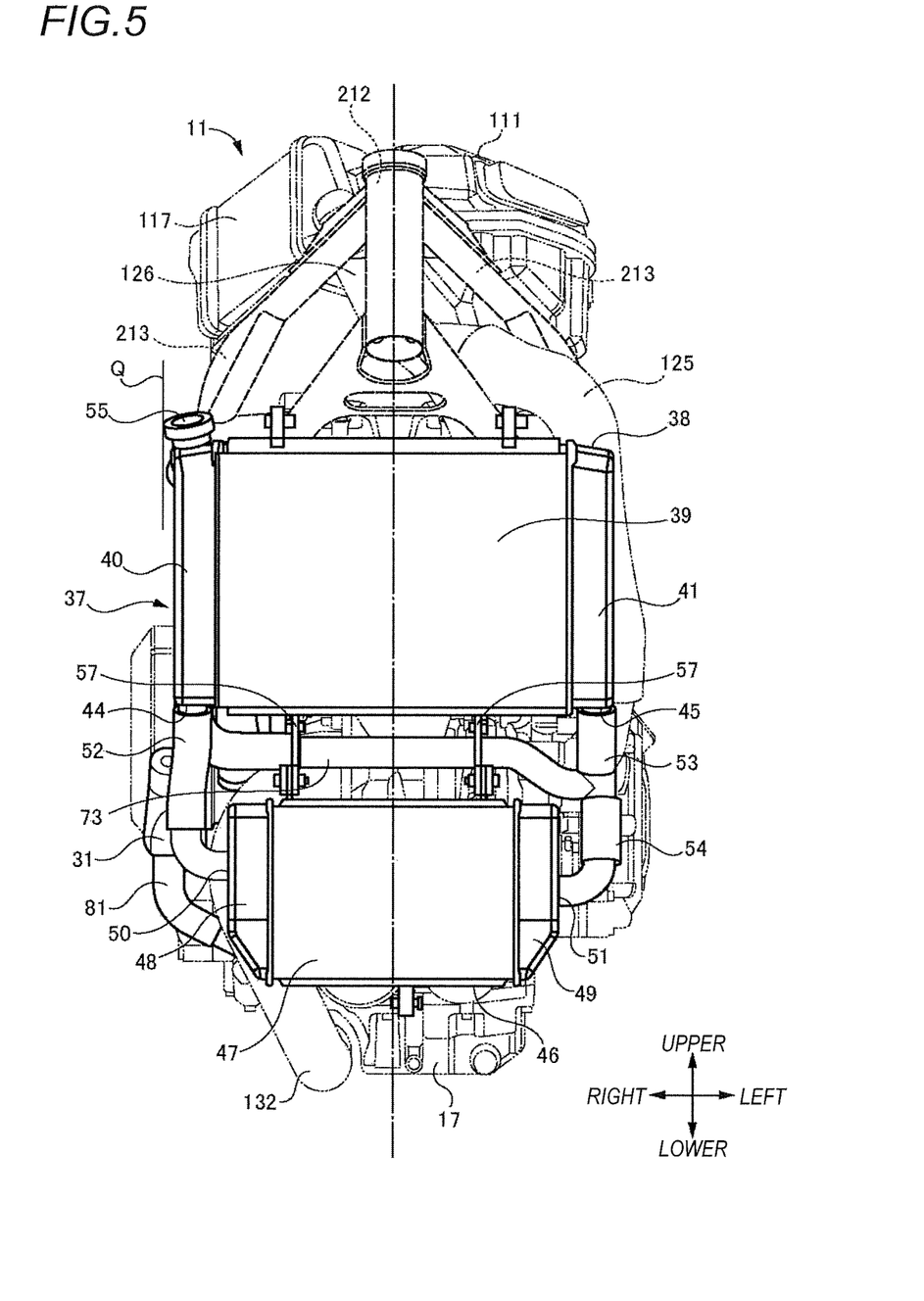
FIG. 5 illustrates the engine unit and a part of the vehicle body frame, as seen from the front.
Figure 6:
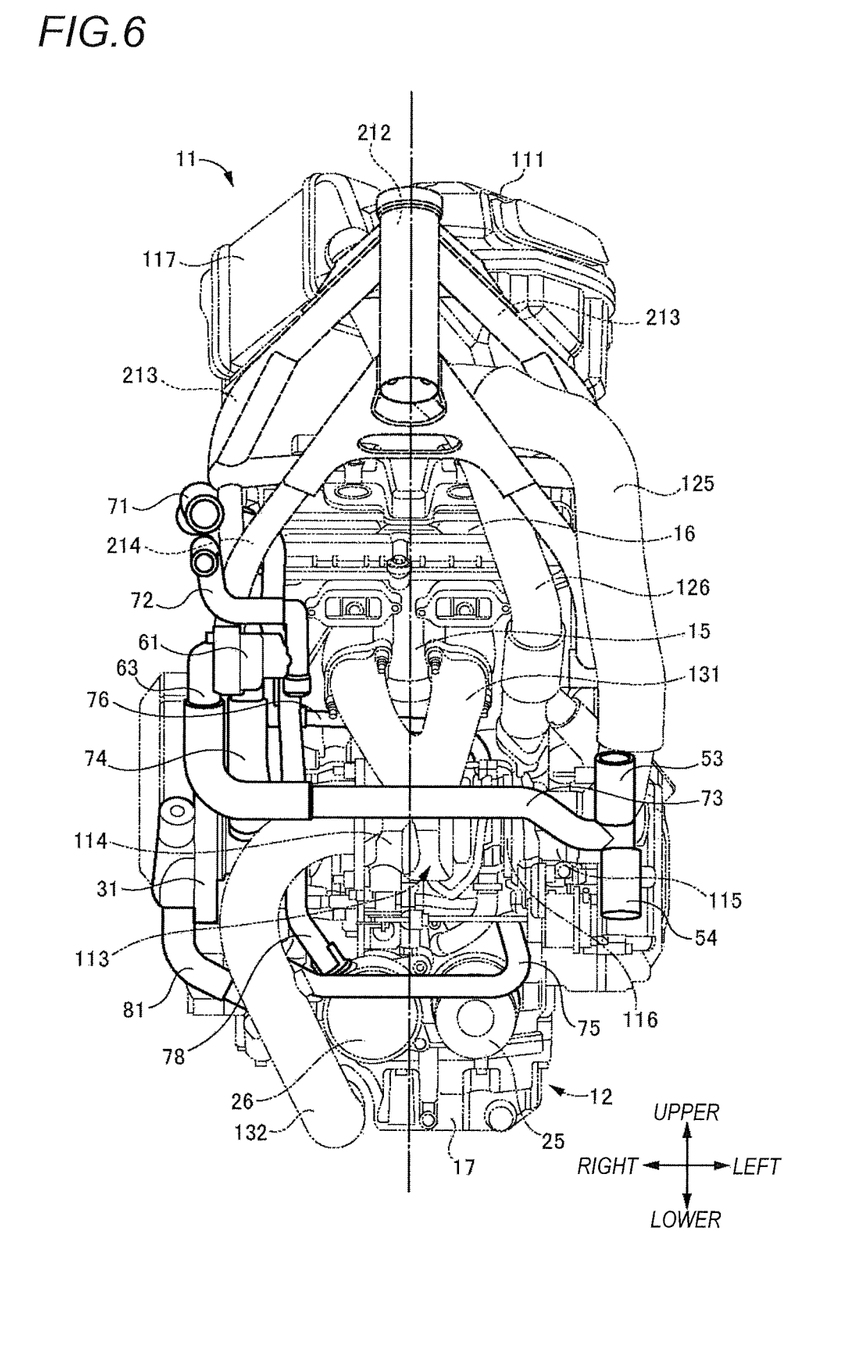
FIG. 6 illustrates the engine unit from which a radiator device is omitted, and a part of the vehicle body frame, as seen from the front.
Figure 7:
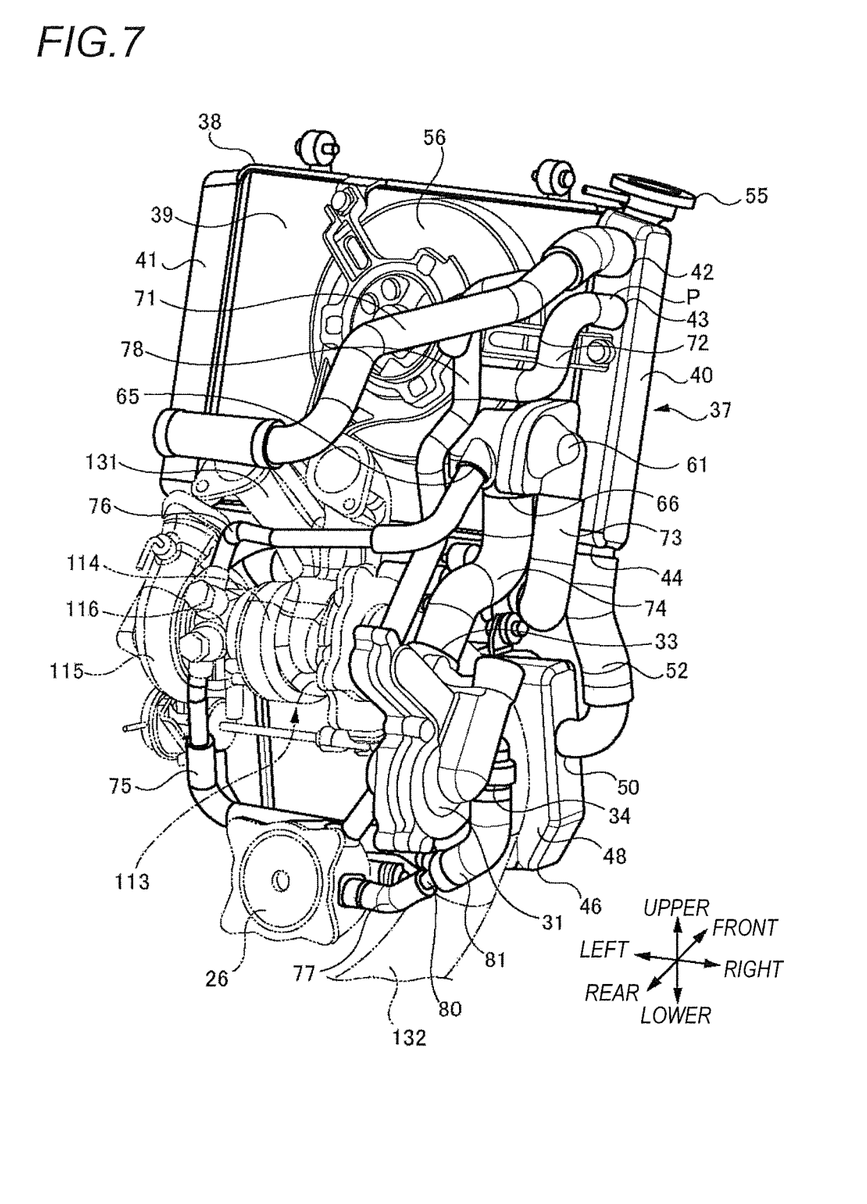
FIG. 7 mainly illustrates a cooling system of the engine unit, as seen from the right rear.
Figure 8:
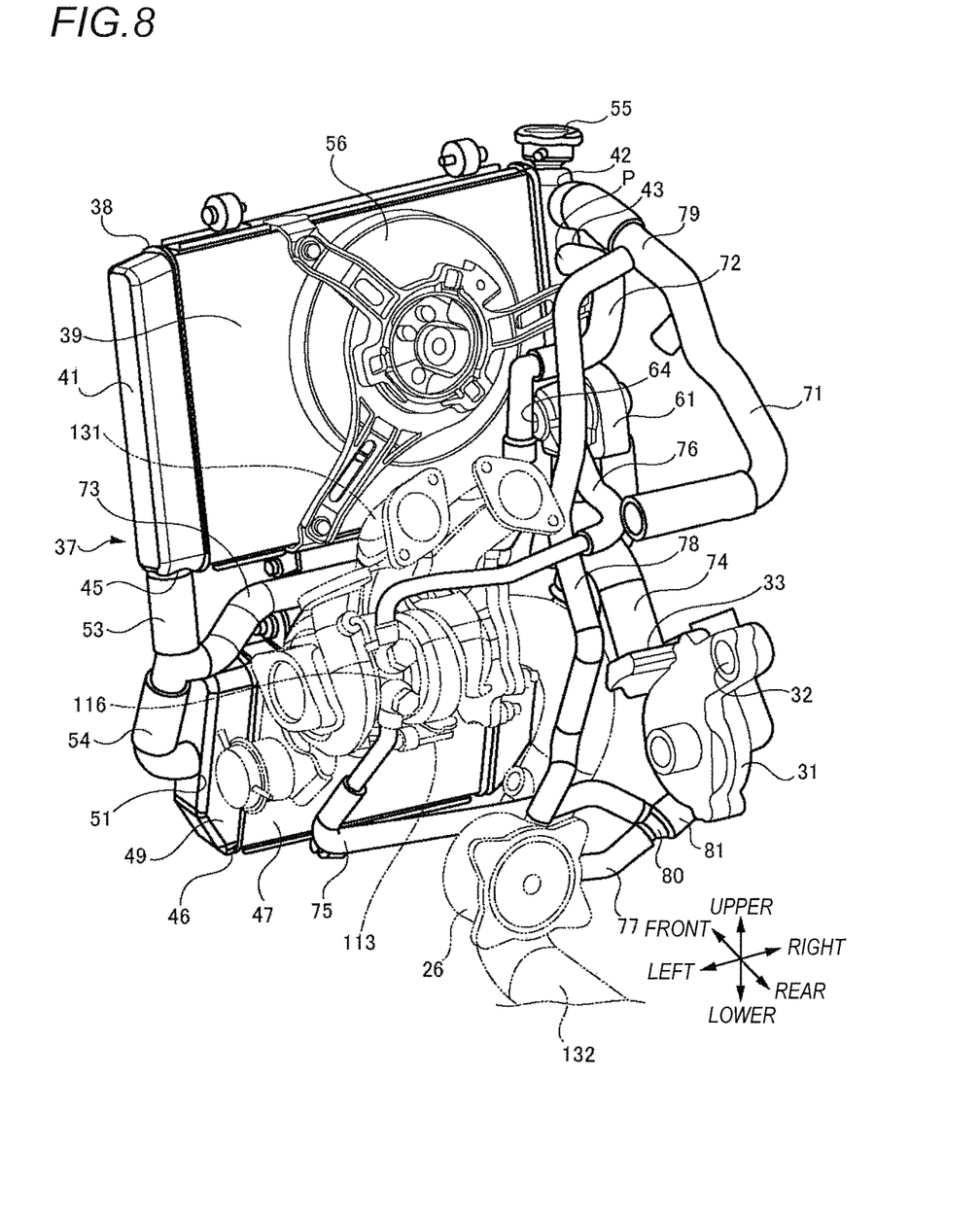
FIG. 8 mainly illustrates the cooling system of the engine unit, as seen from the left rear.
Figure 9:
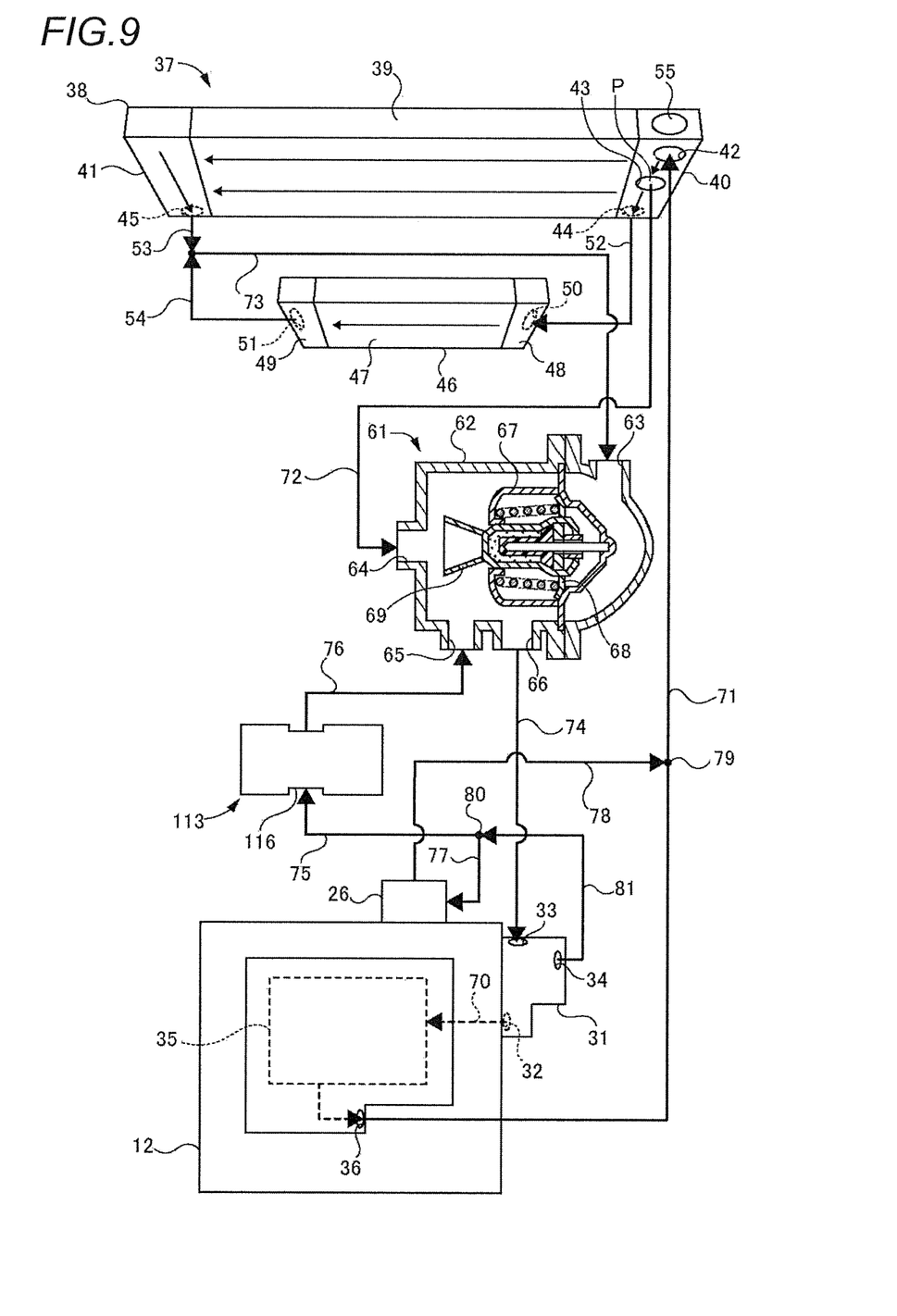
FIG. 9 is a circuit diagram of the cooling system of the engine unit.

FIG. 2 depicts the engine unit 11 and a part of the vehicle body frame 211, as seen from the right, and FIG. 3 depicts the engine unit 11 and a part of the vehicle body frame 211, as seen from the left. FIG. 4 depicts the engine unit 11, as seen from the right front. FIG. 5 depicts the engine unit 11 and a part of the vehicle body frame 211, as seen from the front, and FIG. 6 depicts the engine unit 11 from which the radiator device 37 is omitted, and a part of the vehicle body frame 211, as seen from the front. FIG. 7 depicts a cooling system and the like of the engine unit 11, as seen from the right rear, and FIG. 8 depicts the cooling system and the like of the engine unit 11, as seen from the left rear. FIG. 9 is a pictorial circuit diagram of the cooling system of the engine unit 11.

As shown in FIG. 2, the engine unit 11 includes an engine 12, a part of a drive system configured to transmit power of the engine 12 to the rear wheel 233, a lubrication system configured to lubricate a moveable part of the engine 12, an intake system (including a supercharger 113) configured to an air-fuel mixture to the engine 12, a part of an exhaust system configured to exhaust an exhaust gas, which is to be generated as a result of combustion of the air-fuel mixture, from the engine 12, and a cooling system configured to cool the engine 12 and the like.

In the illustrative embodiment, the engine 12 is a water-cooling type parallel two-cylinder four-stroke gasoline engine. The engine 12 is provided with a crankcase 13 configured to accommodate therein a crankshaft, a cylinder 14 is provided above the crankcase 13, a cylinder head 15 is provided above the cylinder 14, and a cylinder head cover 16 is provided above the cylinder head 15. Also, an oil fan 17 is provided below the crankcase 13. Also, an axis line of the cylinder of the engine 12 is inclined so that an upper side is located ahead of a lower side. Also, the engine 12 is provided with a balance shaft configured to reduce vibrations that are to be generated due to movement of a piston. The balance shaft is arranged in front of the crankshaft. Specifically, as shown in FIG. 3, a balancer chamber 18 is integrally formed at a front part of the crankcase 13 of the engine 12. The balancer chamber 18 is formed by enlarging forward a part of the crankcase 13, and a front part of the balancer chamber 18 protrudes forward from a front wall part of the crankcase 13. The balance shaft is provided in the balancer chamber 18.

Also, as shown in FIG. 2, parts of the drive system such as a primary deceleration mechanism, a clutch, a transmission and the like are accommodated in a transmission case 21 arranged at the rear of the engine unit 11. Also, an oil pump of the oil pump, an oil filter 25 and an oil cooler 26 configuring the lubrication system is provided in the engine unit 11, and the oil filter 25 and the oil cooler 26 are provided at a lower side of a front part of the crankcase 13, as shown in FIG. 6.

Also, as shown in FIG. 3, 4 or 6, the intake system includes an air cleaner 111, a supercharger 113, an intercooler 117, an air discharge duct 118, a surge tank 119, and the like. The air cleaner 111 is a device configured to filter air introduced from an outside, and is arranged at a left side above the engine 12. The supercharger 113 is a device that includes a turbine unit 114, a compressor unit 115 and a bearing unit 116, and is configured to drive the turbine unit 114 by the exhaust gas from the engine 12, to drive the compressor unit 115 by power thereof, and to compress the air supplied through the air cleaner 111 by the compressor unit 115. The supercharger 113 is arranged in front of the engine 12, specifically, in front of the cylinder 14 and the cylinder head 15. The intercooler 117 is a device configured to cool the air of which temperature has been increased due to the compression of the compressor unit 115 of the supercharger 113. The air discharge duct 118 is a duct configured to discharge the cooling air having collided with the intercooler 117 to an outside. The intercooler 117 and the air discharge duct 118 are arranged at a right side above the engine 12. The surge tank 119 is a device configured to rectify a flow of the air cooled by the intercooler 117, and is arranged at a rear side above the engine 12. In the meantime, as the components configuring the intake system, an electronic control throttle device configured to regulate an amount of the air to be supplied to an intake port of the engine 12, an injector configured to inject fuel to the intake port of the engine 12, and the like are also provided above the rear of the cylinder head 15 but are not shown.

Also, the air cleaner 111 and the compressor unit 115 of the supercharger 113 are connected therebetween by an air intake piping 125. Also, the compressor unit 115 of the supercharger 113 and the intercooler 117 are connected therebetween by an air outlet piping 126. As shown in FIG. 6, the air intake piping 125 and the air outlet piping 126 are arranged at the left in front of the engine 12. Also, as shown in FIG. 3, the air intake piping 125 and the air outlet piping 126 extend in a vertical direction between the engine 12 and the radiator device 37, when seeing the straddle-type vehicle 1 from the left. Also, as shown in FIG. 2, the intercooler 117 and the surge tank 119 are connected therebetween by a connecting piping 127. In the meantime, the air intake piping 125, the air outlet piping 126 and the connecting piping 127 are mainly formed by hoses, respectively.

Also, as shown in FIG. 6, in the exhaust system, an exhaust pipe 131 is a piping configured to interconnect an exhaust port of the engine 12 and the turbine unit 114 of the supercharger 113, and is arranged in front of the engine 12. In the illustrative embodiment, the exhaust pipe 131 is integrally formed with a housing of the turbine unit 114 of the supercharger 113. Also, one end of a muffler joint pipe 132 is connected to the turbine unit 114 of the supercharger 113, and the other end of the muffler joint pipe 132 extends toward a muffler.

(Cooling Structure)

Also, as shown in FIGS. 2 and 4 to 9, the cooling system (cooling structure) of the straddle-type vehicle 1 includes a water pump 31, a water jacket 35 (refer to FIG. 9), a radiator device 37, and a cooling water stream control unit 61. Meanwhile, in order to easily specify a component of the cooling system of the engine unit 11 having a plurality of components, in FIGS. 2, 5 and 6, parts except the cooling system of the engine unit 11 are shown with dashed-two dotted lines, and the vehicle body frame 211 is shown with a broken line. Also, in FIGS. 4, 7 and 8, parts except the cooling system of the engine unit 11 are shown with dashed-two dotted lines. Also, the dashed-dotted lines in FIGS. 5 and 6 indicate a center of the straddle-type vehicle 1 in the right and left direction.

The water pump 31 is a device configured to discharge the cooling water to the water jacket 35. As shown in FIG. 2, the water pump 31 is mounted to a right side part of the crankcase 13, and is configured to operate by using rotation of the crankshaft. As shown in FIG. 8, the water pump 31 has a first pump discharge outlet 32 for discharging the cooling water toward the water jacket 35, and a pump inlet 33 for introducing the cooling water into the water pump 31. Also, as shown in FIG. 7, the water pump 31 has a second pump discharge outlet 34 for discharging the cooling water toward the oil cooler 26 and the bearing unit 116 of the supercharger 113.

The water jacket 35 (refer to FIG. 8) is a mechanism configured to cool the cylinder 14 and the cylinder head 15 by the cooling water. The water jacket 35 is provided around a cylinder bore of the cylinder 14, in the vicinity of the intake port and the exhaust port of the cylinder head 15, and the like. Also, as shown in FIG. 2, a rear part of the cylinder head 15 is formed with an outlet 36 for causing the cooling water having flowed in the water jacket 35 to flow out to a radiator inlet piping 71.

The radiator device 37 is a device configured to cool the cooling water by receiving traveling wind or driving the radiator fan 56 to radiate the heat of the cooling water to the atmosphere. As shown in FIG. 2, the radiator device 37 is arranged in front of the engine 12. Also, as shown in FIG. 5, the radiator device 37 includes an upper radiator 38 and a lower radiator 46. The upper radiator 38 and the lower radiator 46 are a lateral flow type, respectively, and are configured to cool the cooling water by circulating the cooling water in the right and left direction (from the right to the left, in the illustrative embodiment) in the respective radiators 38, 46. Also, as shown in FIG. 8, the radiator fan 56 is mounted to a rear surface of the upper radiator 38.

As shown in FIG. 5, the upper radiator 38 includes a core 39 having a plurality of thin pipes and radiation fins for heat exchange, an inflow tank 40 provided at a right side of the core 39, and an outflow tank 41 provided at a left side of the core 39. As shown in FIG. 7, an upper part of a rear surface of the inflow tank 40 of the upper radiator 38 is formed with an upper radiator inlet 42 for introducing the cooling water into the inflow tank 40. Also, a lower side of the upper radiator inlet 42 on the rear surface of the inflow tank 40 is formed with a bypass outlet 43 for causing the cooling water introduced in the inflow tank 40 to flow out to a bypass piping 72. Also, a lower surface of the inflow tank 40 is formed with a distribution outlet 44 for distributing the cooling water introduced in the inflow tank 40 to the lower radiator 46. In the meantime, as shown in FIG. 8, a lower surface of the outflow tank 41 of the upper radiator 38 is formed with an upper radiator outlet 45 for causing the cooling water to flow out from the outflow tank 41.

Also, the lower radiator 46 has a core 47, an inflow tank 48 and an outflow tank 49, like the upper radiator 38. As shown in FIG. 7, a right surface of the inflow tank 48 of the lower radiator 46 is formed with a lower radiator inlet 50 for introducing the cooling water into the inflow tank 48. Also, as shown in FIG. 8, a left surface of the outflow tank 49 is formed with a lower radiator outlet 51 for causing the cooling water to flow out from the outflow tank 49.

Also, as shown in FIG. 5, the distribution outlet 44 of the upper radiator 38 and the lower radiator inlet 50 of the lower radiator 46 are interconnected by a connecting piping 52. Also, an inflow side of a radiator outlet piping 73 configured to guide the cooling water cooled by the radiator device 37 toward the cooling water stream control unit 61 is bifurcated, which then extend upward and downward, respectively. The upper radiator outlet 45 of the upper radiator 38 is connected to an end portion extending upward at the inflow side of the radiator outlet piping 73 via a connecting piping 53. Also, the lower radiator outlet 51 of the lower radiator 46 is connected to an end portion extending downward at the inflow side of the radiator outlet piping 73 via a connecting piping 54. In the meantime, the connecting pipings 52, 53, 54 may be respectively formed by a hose, a pipe or a combination of a hose and a pipe.

Also, the radiator device 37 includes a radiator cap 55. As shown in FIG. 7, the radiator cap 55 is mounted to a water injection port of the cooling water formed on an upper surface of the inflow tank 40. The water injection port is located at the highest position of the cooling system of the straddle-type vehicle 1. The radiator cap 55 has a function of escaping the cooling water to a reservoir tank for cooling water when a pressure in the cooling system is high, and returning the cooling water from reservoir tank for cooling water when the pressure in the cooling system is low. The radiator cap 55 is provided therein with a value configured to open and close in accordance with the pressure in the cooling system, and the radiator cap 55 is connected with the reservoir tank for cooling water via a piping. In the meantime, although the reservoir tank for cooling water is not shown, the reservoir tank for cooling water is arranged between the lower radiator 46 and the crankcase 13, and the like, for example.

In FIG. 2, the cooling water stream control unit 61 has a function of controlling a flow rate of the cooling water to circulate in the radiator device 37 in accordance with a temperature of the cooling water after cooling the engine 12, thereby keeping the temperature of the cooling water at an appropriate temperature. The cooling water stream control unit 61 is arranged at the rear of a right part of the upper radiator 38. Also, the cooling water stream control unit 61 is supported by the bypass piping 72 and a water pump inlet piping 74, which will be described later.

Also, as shown in FIG. 9, the cooling water stream control unit 61 includes a thermostat case 62 and a thermostat 67. The thermostat case 62 is formed to have a box shape by a resin or metal material having heat resistance, for example. Also, the thermostat case 62 is formed with a first cooling water inlet 63 for introducing the cooling water having circulated in the radiator outlet piping 73 into the thermostat case 62 and a second cooling water inlet 64 for introducing the cooling water having circulated in the bypass piping 72 into the thermostat case 62. Also, the thermostat case 62 is formed with a third cooling water inlet 65 for introducing the cooling water having circulated in a supercharger outlet piping 76 into the thermostat case 62. Also, the thermostat case 62 is formed with a cooling water outlet 66 for causing the cooling water to flow out from the thermostat case 62 into the water pump inlet piping 74.

The thermostat 67 is accommodated in the thermostat case 62. The thermostat 67 has a main valve 68 and a sub-valve 69. The main valve 68 is configured to change a flow rate of the cooling water to circulate from the first cooling water inlet 63 toward the cooling water outlet 66. The sub-valve 69 is configured to change a flow rate of the cooling water to circulate from the second cooling water inlet 64 toward the cooling water outlet 66.

The detailed arrangement and connection of the respective components configuring the cooling system are described. That is, as shown in FIG. 2, the water pump 31 is arranged at the front of a shaft center X1 of the crankshaft on the right side surface of the crankcase 13. Specifically, the water pump 31 is arranged so that a drive shaft center of the water pump 31 is coaxial with a shaft center X2 of the balance shaft.

Also, as shown in FIG. 9, a path 70 configured to guide the cooling water discharged from the first pump discharge outlet 32 toward the water jacket 35 is formed between the first pump discharge outlet 32 of the water pump 31 and the water jacket 35. The path 70 is formed in the crankcase 13 and the like.

Also, as shown in FIG. 6, the cooling water stream control unit 61 is arranged at a right side of the center of the straddle-type vehicle 1 in the right and left direction. Specifically, the cooling water stream control unit 61 is arranged in front of a right front corner part of the cylinder head 15. More specifically, the cooling water stream control unit 61 overlaps with a part of the vehicle body frame 211 extending downward toward an engine mount part 15A (refer to FIG. 2) provided at a right front part of the cylinder head 15, i.e., overlaps with a lower end of the right down tube 214, when seeing the straddle-type vehicle 1 from the front. Also, as shown in FIG. 6, the cooling water stream control unit 61 is arranged at a position closer to the center of the straddle-type vehicle 1 in the right and left direction than the water pump 31. Also, as can be seen from comparison of FIGS. 5 and 6, the cooling water stream control unit 61 is arranged at a position closer to the center of the straddle-type vehicle 1 in the right and left direction than the rightmost part of the radiator device 37 (including the radiator cap 55). In the meantime, a line Q in FIG. 5 indicates a position of the rightmost part of the radiator device 37.

Also, as shown in FIG. 2, the cooling water stream control unit 61 is arranged at a position lower than the cylinder head cover 16. Specifically, the cooling water stream control unit 61 is arranged in front of the cylinder head 15. Also, the cooling water stream control unit 61 is arranged at a position higher than the water pump 31. Also, the cooling water stream control unit 61 is arranged between the engine 12 and the radiator device 37, when seeing the straddle-type vehicle 1 from the right.

Also, as shown in FIG. 2, the outlet 36 of the water jacket 35 and the upper radiator inlet 42 of the upper radiator 38 are connected therebetween by the radiator inlet piping 71. The radiator inlet piping 71 extends rightward from a center of a rear part of the cylinder head 15 in the right and left direction, as shown in FIG. 7, and sequentially passes the right of the cylinder head 15 and the right of the cylinder head cover 16, is slightly tilted rightward with extending forward and reaches the upper radiator inlet 42, as shown in FIG. 2. Also, as shown in FIG. 2, the radiator inlet piping 71 is adjacent to the side frame 215 below the right side frame 215 and extends along the side frame 215, when seeing the straddle-type vehicle 1 from the right.

Also, as shown in FIG. 5, the upper radiator outlet 45 of the upper radiator 38 and the lower radiator outlet 51 of the lower radiator 46 are respectively connected to two end portions branched upward and downward from the inflow side of the radiator outlet piping 73, via the connecting pipings 53, 54. As shown in FIG. 6, an end portion of an outflow side of the radiator outlet piping 73 is connected to the first cooling water inlet 63 formed at the thermostat case 62 of the cooling water stream control unit 61. As shown in FIG. 5, the radiator outlet piping 73 is arranged between the upper radiator 38 and the lower radiator 46. Specifically, the radiator outlet piping 73 extends from a left position (adjacent to the lower part of the outflow tank 41 of the upper radiator 38) in a region between the upper radiator 38 and the lower radiator 46 to a right position (adjacent to the lower part of the inflow tank 40 of the upper radiator 38) in the region between the upper radiator 38 and the lower radiator 46 via the center of the straddle-type vehicle 1 in the right and left direction, in a horizontal linear form in a direction perpendicular to a direct advancing direction of the straddle-type vehicle 1. Then, as shown in FIG. 6, the radiator outlet piping 73 extends rearward with being curved, extends upward with being further curved, and reaches the first cooling water inlet 63 located at the rear of the inflow tank 40 of the upper radiator 38. Also, as shown in FIG. 5, the radiator outlet piping 73 is fixed to the upper radiator 38 and the lower radiator 46 by a pair of brackets 57 spaced in the right and left direction.

Also, as shown in FIGS. 7 and 8, the bypass outlet 43 of the upper radiator 38 and the second cooling water inlet 64 of the thermostat case 62 are connected therebetween by a bypass piping 72. The bypass piping 72 is arranged at a right side of the center of the straddle-type vehicle 1 in the right and left direction, as shown in FIG. 6, is arranged at a left side of the rightmost part of the radiator device 37, as can be seen from comparison of FIGS. 5 and 6, and is also arranged between the engine 12 and the radiator device 37, when seeing the straddle-type vehicle 1 from the right, as shown in FIG. 2.

Also, as shown in FIG. 7, the cooling water outlet 66 of the thermostat case 62 and the pump inlet 33 of the water pump 31 are connected therebetween by the water pump inlet piping 74. The water pump inlet piping 74 is arranged at a right side of the center of the straddle-type vehicle 1 in the right and left direction, as shown in FIG. 6, is arranged at a left side of the rightmost part of the radiator device 37, as can be seen from comparison of FIGS. 5 and 6, and is also arranged at the rear of the radiator device 37, when seeing the straddle-type vehicle 1 from the right, as shown in FIG. 2.

Also, the cooling system of the straddle-type vehicle 1 has a structure of cooling the bearing unit 116 of the supercharger 113 by using the cooling water. By cooling the bearing unit 116, it is possible to suppress an increase in temperature of lubricant of bearings configured to rotatably support rotating shafts of a turbine wheel and a compressor impeller of the supercharger 113. Specifically, as shown in FIGS. 7 and 8, a cooling water path is formed by a common piping 81, a branching part 80 and a supercharger inlet piping 75 between the second pump discharge outlet 34 of the water pump 31 and the bearing unit 116. The branching part 80 is a component for branching the cooling water circulating in the common piping 81 into the supercharger inlet piping 75 and an oil cooler inlet piping 77, and is a Y-shaped joint, for example. Also, the bearing unit 116 and the third cooling water inlet 65 of the cooling water stream control unit 61 are connected therebetween by the supercharger outlet piping 76. The supercharger inlet piping 75 and the supercharger outlet piping 76 are all arranged between the engine 12 and the radiator device 37.

Also, the cooling system of the straddle-type vehicle 1 has a structure of cooling engine oil by using the cooling water. Specifically, as shown in FIG. 8, a cooling water path is formed by the common piping 81, the branching part 80 and the oil cooler inlet piping 77 between the second pump discharge outlet 34 of the water pump 31 and the oil cooler 26. Also, a part of the radiator inlet piping 71, which is close to the upper radiator inlet 42, is provided with a joining part 79, and the oil cooler 26 and the joining part 79 are connected therebetween by an oil cooler outlet piping 78. The joining part 79 is a connection port formed at a part of a peripheral wall of the radiator inlet piping 71, for example. On the other hand, the joining part 79 may be formed using a T-shaped joint. The oil cooler outlet piping 78 extends vertically between the engine 12 and the radiator device 37 at the right (specifically, the right of the supercharger 113) of the center of the straddle-type vehicle 1 in the right and left direction.

The radiator inlet piping 71, the bypass piping 72, the radiator outlet piping 73, the water pump inlet piping 74, the supercharger inlet piping 75, the supercharger outlet piping 76, the oil cooler inlet piping 77 and the oil cooler outlet piping 78 may be respectively formed by a pipe, a hose or a combination of a pipe and a hose. In the meantime, when providing the bypass piping 72 and the water pump inlet piping 74 with a function of supporting the cooling water stream control unit 61, the pipings are formed by a hose of rigid resin or a pipe of resin or metal so as to improve the support stability of the cooling water stream control unit 61.

An operation of the cooling system of the straddle-type vehicle 1 is described. First, when a temperature of the cooling water is equal to or lower than a predetermined reference temperature T1 (first state), the cooling system operates as follows. That is, in FIG. 9, when a temperature of the cooling water in the thermostat case 62 is equal to or lower than the predetermined reference temperature T1, the thermostat 67 of the cooling water stream control unit 61 closes the main valve 68 and opens the sub-valve 69. Thereby, in the thermostat case 62, the path between the first cooling water inlet 63 and the cooling water outlet 66 is blocked, and the path between the second cooling water inlet 64 and the cooling water outlet 66 is connected. This state is formed upon warming-up operation of the engine 12, for example.

In the first state, the cooling water discharged from the first pump discharge outlet 32 of the water pump 31 circulates in the water jacket 35 to cool the engine 12, circulates in the radiator inlet piping 71, and flows into the inflow tank 40 from the upper radiator inlet 42 of the upper radiator 38. In the inflow tank 40, the cooling water cannot flow toward the core 39 of the upper radiator 38 and the lower radiator 46 but can flow from the bypass outlet 43 toward the bypass piping 72. The cooling water having flowed into the inflow tank 40 flows out from the bypass outlet 43, circulates in the bypass piping 72, and flows into the thermostat case 62 from the second cooling water inlet 64 of the thermostat case 62. Here, a position P corresponding to the bypass outlet 43 is a branch position at which the path of the cooling water is branched to a path in which the cooling water is guided to the cooling water stream control unit 61 via the core 39 of the upper radiator 38 and the lower radiator 46 and a path in which the cooling water is guided to the cooling water stream control unit 61 without through the core 39 of the upper radiator 38 or the lower radiator 46.

The cooling water having flowed into the thermostat case 62 flows out from the cooling water outlet 66 of the thermostat case 62, circulates in the water pump inlet piping 74, and returns to the water pump 31 through the pump inlet 33.

Then, when the temperature of the cooling water becomes higher than a predetermined reference temperature T2 (T2>T1) (second state), the cooling system operates as follows. That is, when the temperature of the cooling water in the thermostat case 62 becomes higher than the predetermined reference temperature T2, the thermostat 67 opens the main valve 68 and closes the sub-valve 69. Thereby, in the thermostat case 62, the path between the first cooling water inlet 63 and the cooling water outlet 66 is connected, and the path between the second cooling water inlet 64 and the cooling water outlet 66 is blocked.

In the second state, the cooling water discharged from the water pump 31 first sequentially circulates in the water jacket 35 and the radiator inlet piping 71 and flows into the inflow tank 40 of the upper radiator 38, like the first state. In the inflow tank 40, the cooling water cannot flow from the bypass outlet 43 toward the bypass piping 72 but can flow toward the core 39 of the upper radiator 38 and the lower radiator 46. The cooling water having flowed into the inflow tank 40 is branched into a path toward the core 39 of the upper radiator 38 and a path toward the lower radiator 46. The cooling water branched into the path toward the core 39 of the upper radiator 38 circulates in the core 39, is cooled by the core 39, flows into the outflow tank 41 and flows out from the upper radiator outlet 45. On the other hand, the cooling water branched into the path toward the lower radiator 46 sequentially circulates in the connecting piping 52, the inflow tank 48 of the lower radiator 46 and the core 47, is cooled by the core 47, flows into the outflow tank 49 of the lower radiator 46, and flows out from the lower radiator outlet 51. The cooling waters having flowed out from the upper radiator outlet 45 and the lower radiator outlet 51 circulate in the connecting pipings 53, 54, reach the radiator outlet piping 73, join in the radiator outlet piping 73, and flow into the thermostat case 62 through the first cooling water inlet 63. Thereafter, the flow of the cooling water returning to the water pump 31 from the thermostat case 62 is the same as the first state.

Then, when the temperature of the cooling water is higher than the reference temperature T1 and is equal to or lower than the reference temperature T2 (third state), the thermostat 67 opens both the main valve 68 and the sub-valve 69. Thereby, in the thermostat case 62, the path between the first cooling water inlet 63 and the cooling water outlet 66 is connected, and the path between the second cooling water inlet 64 and the cooling water outlet 66 is connected. In the third state, the cooling water having flowed into the inflow tank 40 of the upper radiator 38 is branched into the path toward the core 39 of the upper radiator 38, the path toward the lower radiator 46 and a path in which the cooling water is to flow out from the bypass outlet 43. The branched cooling waters circulate in the respective paths, flow into the thermostat case 62, and return to the water pump 31, like the first state or the second state.

Also, the thermostat 67 changes degrees of opening of the main valve 68 and the sub-valve 69, in accordance with the temperature of the cooling water to change within a temperature range higher than the reference temperature T1 and equal to or lower than the reference temperature T2. Thereby, a ratio of a flow rate of the cooling water circulating in the core 39 of the upper radiator 38 and the lower radiator 46 and a flow rate of the cooling water circulating in the bypass piping 72 changes in accordance with the temperature of the cooling water.

Meanwhile, in any state of the first state, the second state and the third state, the cooling system of the straddle-type vehicle 1 further operates, as follows. That is, the cooling water discharged from the second pump discharge outlet 34 of the water pump 31 circulates in the common piping 81, reaches the branching part 80, and is branched into the supercharger inlet piping 75 and the oil cooler inlet piping 77 at the branching part 80. The cooling water branched into the supercharger inlet piping 75 circulates in the bearing unit 116 of the supercharger 113 to cool the bearing unit 116. Then, the cooling water sequentially circulates in the supercharger outlet piping 76, the third cooling water inlet 65, the thermostat case 62, the cooling water outlet 66 and the water pump inlet piping 74, and returns to the water pump 31. On the other hand, the cooling water branched into the oil cooler inlet piping 77 reaches the oil cooler 26 to cool the engine oil. Then, the cooling water circulates in the oil cooler outlet piping 78, reaches the joining part 79 of the radiator inlet piping 71, and joins the cooling water circulating in the radiator inlet piping 71 from the water jacket 35 toward the inflow tank 40 of the upper radiator 38.

As described above, according to the straddle-type vehicle 1 of the illustrative embodiment of the present disclosure, since the cooling water stream control unit 61 is arranged at the position lower than the cylinder head cover 16, it is possible to easily form a space, which can be used to arrange the fuel tank 241, above the engine 12. Thereby, it is possible to enlarge the fuel tank 241, thereby increasing a capacity of the fuel tank 241. Also, the space above the engine 12 can be used to arrange the air cleaner 111, the intercooler 117 or the surge tank 119. Thereby, it is possible to easily enlarge the air cleaner 111, the intercooler 117 or the capacity of the surge tank 119, and to improve the degree of design freedom with respect to shapes of the components.

Also, since the cooling water stream control unit 61 is arranged between the engine 12 and the radiator device 37, it is possible to make the cooling water stream control unit 61 inconspicuous, when seeing the straddle-type vehicle 1 from an outside. Accordingly, it is possible to improve a design property of an outer appearance of the straddle-type vehicle 1.

Also, since the cooling water stream control unit 61 is arranged between the engine 12 and the radiator device 37, it is possible to easily prevent the cooling water stream control unit 61 or the piping connected thereto such as the radiator inlet piping 71, the bypass piping 72, the radiator outlet piping 73, the water pump inlet piping 74 and the like from protruding laterally from the engine unit 11. Accordingly, it is possible to reduce a width (a length in the right and left direction) of the engine unit 11, thereby improving the design property of the outer appearance of the straddle-type vehicle.

Also, since the cooling water stream control unit 61 is arranged between the engine 12 and the radiator device 37, it is possible to arrange the cooling water stream control unit 61 in close vicinity to the radiator device 37. Thereby, it is possible to shorten the piping configured to interconnect the cooling water stream control unit 61 and the radiator device 37, so that it is possible to make the piping inconspicuous. Specifically, it is possible to shorten the bypass piping 72 and the radiator outlet piping 73, thereby making the same inconspicuous. Accordingly, it is possible to improve the design property of the outer appearance of the straddle-type vehicle 1.

Also, according to the straddle-type vehicle 1 of the illustrative embodiment of the present disclosure, the water pump 31 is mounted to the right part of the crankcase 13, and the cooling water stream control unit 61 is arranged at the position, which is lower than the cylinder head cover 16 and is located between the engine 12 and the radiator device 37, at the same side as the water pump 31 in the right and left direction of the straddle-type vehicle 1. By this configuration, the water pump 31 and the cooling water stream control unit 61 can be arranged closely to each other. Thereby, it is possible to shorten the piping configured to interconnect the cooling water stream control unit 61 and the water pump 31, specifically, the water pump inlet piping 74, so that it is possible to make the piping inconspicuous. Accordingly, it is possible to improve the design property of the outer appearance of the straddle-type vehicle 1.

Also, according to the straddle-type vehicle 1 of the illustrative embodiment of the present disclosure, since the cooling water stream control unit 61 is arranged at the position closer to the center of the straddle-type vehicle 1 in the right and left direction than the water pump 31, it is possible to make the cooling water stream control unit 61 more inconspicuous.

Also, according to the straddle-type vehicle 1 of the illustrative embodiment of the present disclosure, the cooling water stream control unit 61 is arranged at the position overlapping with the part (specifically, the lower end of the right down tube 214) of the vehicle body frame 211 extending downward toward the engine mount part 15A provided at the right front part of the cylinder head 15, when seeing the straddle-type vehicle 1 from the front. Thereby, it is possible to effectively use a dead space between the radiator device 37 and the vehicle body frame 211, as a space for arranging the cooling water stream control unit 61.

Also, according to the straddle-type vehicle 1 of the illustrative embodiment of the present disclosure, the cooling water stream control unit 61 is arranged at the position closer to the center of the straddle-type vehicle 1 in the right and left direction than the rightmost part of the radiator device 37. Thereby, it is possible to prevent the cooling water stream control unit 61 or the piping connected thereto from protruding rightward from the engine unit 11, so that it is possible to reduce the width of the engine unit 11. Also, it is possible to hide the cooling water stream control unit 61 by the radiator device 37, so that it is possible to make the cooling water stream control unit 61 inconspicuous.

Also, according to the straddle-type vehicle 1 of the illustrative embodiment of the present disclosure, the bypass piping 72 is arranged at the right of the center of the straddle-type vehicle 1 in the right and left direction, at the left of the rightmost part of the radiator device 37, and between the engine 12 and the front surface of the radiator device 37, when seeing the straddle-type vehicle 1 from a side. Also, the water pump inlet piping 74 is arranged at the right of the center of the straddle-type vehicle 1 in the right and left direction, at the left of the rightmost part of the radiator device 37, and at the rear of the radiator device 37, when seeing the straddle-type vehicle 1 at a side. That is, the bypass piping 72, the cooling water stream control unit 61 and the water pump inlet piping 74 are concentrated in a region at the right of the center of the straddle-type vehicle 1 in the right and left direction and between the engine 12 and the radiator device 37, and are aligned orderly downward from the upper of the region. Thereby, it is possible to make the bypass piping 72, the cooling water stream control unit 61 and the water pump inlet piping 74 inconspicuous. Also, it is possible to shorten the bypass piping 72 and the water pump inlet piping 74, so that it is possible to reduce a pressure loss of the cooling water to flow in the pipings. Also, it is possible to easily avoid contact of the bypass piping 72, the cooling water stream control unit 61 and the water pump inlet piping 74 with other components.

Also, since the bypass piping 72, the cooling water stream control unit 61 and the water pump inlet piping 74 are concentrated in the region at the right of the center of the straddle-type vehicle 1 in the right and left direction and between the engine 12 and the radiator device 37, it is possible to open a region at the left of the center of the straddle-type vehicle 1 in the right and left direction and between the engine 12 and the radiator device 37 for arrangement of other components. Thereby, it is possible to arrange the air intake piping 125 and air outlet piping 126 configuring the intake system so that they extend vertically between the engine 12 and the radiator at the left of the center of the straddle-type vehicle 1 in the right and left direction, when seeing the straddle-type vehicle 1 from a side. Accordingly, it is possible to make the air intake piping 125 and the air outlet piping 126 inconspicuous and to reduce a pressure loss of the air to flow in the air intake piping 125 and the air outlet piping 126. According to the straddle-type vehicle 1 of the illustrative embodiment of the present disclosure, even when the number of components increases as a result of the mount of the supercharger 113, it is possible to efficiently arrange the respective components. Accordingly, it is possible to easily implement the straddle-type vehicle that is small, has a favorable design property and includes the supercharger.

Also, according to the straddle-type vehicle 1 of the illustrative embodiment of the present disclosure, the cooling water stream control unit 61 is supported by the bypass piping 72 and the water pump inlet piping 74. Thereby, it is not necessary to provide a dedicated bracket for supporting the cooling water stream control unit 61, so that it is possible to reduce the number of components. Also, since it is not necessary to consider a mounting position and a mounting method of a bracket to the vehicle body frame 211, the engine 12 and the like, it is possible to improve a degree of freedom of arrangement of the cooling water stream control unit 61.

Also, according to the straddle-type vehicle 1 of the illustrative embodiment of the present disclosure, the water pump 31 and the cooling water stream control unit 61 are arranged at the positions lower than the cylinder head cover 16, and the pipings 71 to 78 and the like configuring the cooling system do not pass above the engine 12 or a position higher than the engine. Therefore, it is not necessary to arrange the water injection port of the cooling water above the engine, unlike the motorcycle disclosed in Patent Document 1. Therefore, according to the straddle-type vehicle 1 of the illustrative embodiment of the present disclosure, it is possible to form the water injection port on the upper surface of the inflow tank 40 of the upper radiator 38, so that it is possible to improve maintainability.

In the illustrative embodiment, the components of the cooling system such as the water pump 31, the cooling water stream control unit 61, the radiator inlet piping 71, the bypass piping 72 and the water pump inlet piping 74 are arranged at the right side of the straddle-type vehicle 1, and the components of the intake system such as the air intake piping 125 and the air outlet piping 126 are arranged at the left side of the straddle-type vehicle 1. However, the arrangements may be reversed.

Also, in the illustrative embodiment, in order to circulate the cooling water without through the core of the radiator, the cooling water is caused to flow from the radiator inlet piping 71 toward the bypass piping 72 via the inflow tank 40 of the upper radiator 38. However, the present disclosure is not limited thereto. For example, the bypass piping 72 may be directly connected to a position close to the connection part of the radiator inlet piping 71 with the upper radiator inlet 42, and the cooling water may be caused to flow from the radiator inlet piping 71 toward the bypass piping 72. According to this configuration, a position at which the bypass piping 72 is directly connected to the radiator inlet piping 71 is the branch position at which the path is branched to the path in which the cooling water is guided to the cooling water stream control unit 61 via the core 39 of the upper radiator 38 and the lower radiator 46 and the path in which the cooling water is guided to the cooling water stream control unit 61 without through the core 39 of the upper radiator 38 or the lower radiator 46.

Also, in the illustrative embodiment, the radiator device 37 including the upper radiator 38 and the lower radiator 46 is adopted. However, a radiator device having a single radiator may also be adopted. Also, as the thermostat of the cooling water stream control unit 61, a thermostat without the sub-valve 69 may also be used.

Also, in the illustrative embodiment, in order to support the engine 12 to the vehicle body frame 211, the engine mount part 15A provided to the cylinder head 15 is connected to the lower end portion of the down tube 214. However, instead of this configuration, the cylinder 14 may be provided with an engine mount part, and the engine mount part may be connected to the lower end portion of the down tube 214.

Also, in the illustrative embodiment, the cooling water stream control unit 61 is supported by the bypass piping 72 and the water pump inlet piping 74. However, the cooling water stream control unit 61 may also be supported to the vehicle body frame 211 and the like via a bracket and the like.

Also, the present disclosure can be applied to a straddle-type vehicle having no supercharger, as well. Also, the number of the cylinders of the engine is not limited. Also, the present disclosure is not limited to the motorcycle, and can be applied to other straddle-type vehicles such as an automatic three-wheeled vehicle, a buggy car and the like, as well.

Also, in the illustrative embodiment, the radiator device 37 is a specific example of "radiator" defined in the claims. Also, the path formed from the upper radiator inlet 42 to the bypass outlet 43 in the radiator inlet piping 71 and the inflow tank 40 of the upper radiator 38 is a specific example of "first path" defined in the claims. Also, the path formed by the core 39 of the upper radiator 38, the outflow tank 41 of the upper radiator 38, the lower radiator 46, the connecting pipings 52, 53, 54, and the radiator outlet piping 73 is a specific example of "second path" defined in the claims. Also, the path formed by the bypass piping 72 is a specific example of "third path" defined in the claims. Also, the path formed by the water pump inlet piping 74 is a specific example of "fourth path" defined in the claims.

Also, the present disclosure can be appropriately changed without departing from the gist or spirit of the invention that can be understood from the claims and the specification, and a straddle-type vehicle having the changes is also included in the technical spirit of the present disclosure.

What is claimed is:

1. A straddle-type vehicle comprising:
    an engine comprising a crankcase, a cylinder provided above the crankcase, a cylinder head provided above the cylinder, and a cylinder head cover provided above the cylinder head;
    a water pump configured to discharge cooling water;
    a water jacket configured to cool the engine by the cooling water discharged from the water pump;
    a radiator arranged in front of the engine and configured to cool the cooling water after cooling the engine; and
    a cooling water stream control unit configured to control a flow rate of the cooling water to circulate in the radiator, based on a temperature of the cooling water after cooling the engine,
    wherein the water pump is mounted to a part of the crankcase at one side in a right and left direction of the straddle-type vehicle, and
    wherein the cooling water stream control unit is arranged at a position that is located at the one side of a center of the straddle-type vehicle in the right and left direction, is lower than the cylinder head cover and is located between the engine and the radiator, when seeing the straddle-type vehicle from a side.

2. The straddle-type vehicle according to claim 1, wherein the cooling water stream control unit is arranged at a position closer to the center of the straddle-type vehicle in the right and left direction than the water pump.

3. The straddle-type vehicle according to claim 1, wherein the cooling water stream control unit overlaps with a part of a vehicle body frame extending downward toward an engine mount part, which is provided at a front part of the cylinder head or the cylinder and at the one side in the right and left direction of the straddle-type vehicle, when seeing the straddle-type vehicle from the front.

4. The straddle-type vehicle according to claim 1, wherein the cooling water stream control unit is arranged at a position closer to the center of the straddle-type vehicle in the right and left direction than a part of the radiator located at the furthest one side in the right and left direction of the straddle-type vehicle.

5. The straddle-type vehicle according to claim 1, further comprising:
a first path configured to guide the cooling water from the water jacket to a branch position that is located at the one side in the right and left direction of the straddle-type vehicle and also in front of the cylinder head cover;
a second path configured to guide the cooling water from the branch position to the cooling water stream control unit via a core of the radiator;
a third path configured to guide the cooling water from the branch position to the cooling water stream control unit without through the core of the radiator; and
a fourth path configured to guide the cooling water from the cooling water stream control unit to the water pump,
wherein the third path is arranged at the one side of the center of the straddle-type vehicle in the right and left direction, at the other side than the part of the radiator located at the furthest one side in the right and left direction of the straddle-type vehicle and between the engine and a front surface of the radiator, when seeing the straddle-type vehicle from a side, and
wherein the fourth path is arranged at the one side of the center of the straddle-type vehicle in the right and left direction, at the other side than the part of the radiator located at the furthest one side in the right and left direction of the straddle-type vehicle, and at the rear of the radiator, when seeing the straddle-type vehicle from a side.

6. The straddle-type vehicle according to claim 5, wherein the cooling water stream control unit is supported by a piping forming the third path and a piping forming the fourth path.

7. The straddle-type vehicle according to claim 1, further comprising:
an air cleaner configured to purify air for fuel combustion;
a supercharger configured to compress the air purified by the air cleaner;
an intercooler configured to cool the air compressed by the supercharger and to supply the same to the engine;
an air inlet piping configured to guide the air from the air cleaner to the supercharger; and
an air outlet piping configured to guide the air from the supercharger to the intercooler,
wherein the air inlet piping and the air outlet piping extend vertically between the engine and the radiator at the other side of the center of the straddle-type vehicle in the right and left direction, when seeing the straddle-type vehicle from a side.

* * * * *